United States Patent [19]

Moch et al.

[11] Patent Number: 4,887,861
[45] Date of Patent: Dec. 19, 1989

[54] UNDER DASH COVER

[76] Inventors: John E. Moch, 348 N. Bitterbush, Orange, Calif. 92668; Ronald L. Jones, 1327 N. Poinsettia, Santa Ana, Calif. 92701

[21] Appl. No.: 244,741

[22] Filed: Sep. 15, 1988

[51] Int. Cl.⁴ .............................................. B62D 25/14
[52] U.S. Cl. ......................................... 296/70; 180/90
[58] Field of Search ........................... 296/70; 180/90; D12/192

[56] References Cited

U.S. PATENT DOCUMENTS 4,360,241 11/1982 Fukunaga .............................. 296/70

FOREIGN PATENT DOCUMENTS 128968 1/1983 Japan .

Primary Examiner—Robert R. Song
Attorney, Agent, or Firm—Knobbe, Martens, Olson & Bear

[57] ABSTRACT

A detachably attached panel for closing off the bottom of the space behind a vehicle instrument panel, directly under the dashboard so as to enhance the aesthetic qualities of the vehicle interior is described. The under dash cover comprises an axially elongate formed body having an outwardly facing surface and an inwardly facing surface. Contiguous with the upper edge of the elongate body is a plurality of lips, adapted to rest on a frame lip under the vehicle dashboard. The lower edge of the under dash cover is provided with a magnet to held hold the dash cover in place, and to facilitate ease of installation. A tab is provided at the opposite end of the cover and is constructed and arranged to secure the under dash cover in place by insertion into a loop, disposed on the upwardly sloping surface of the vehicle floor.

26 Claims, 7 Drawing Sheets

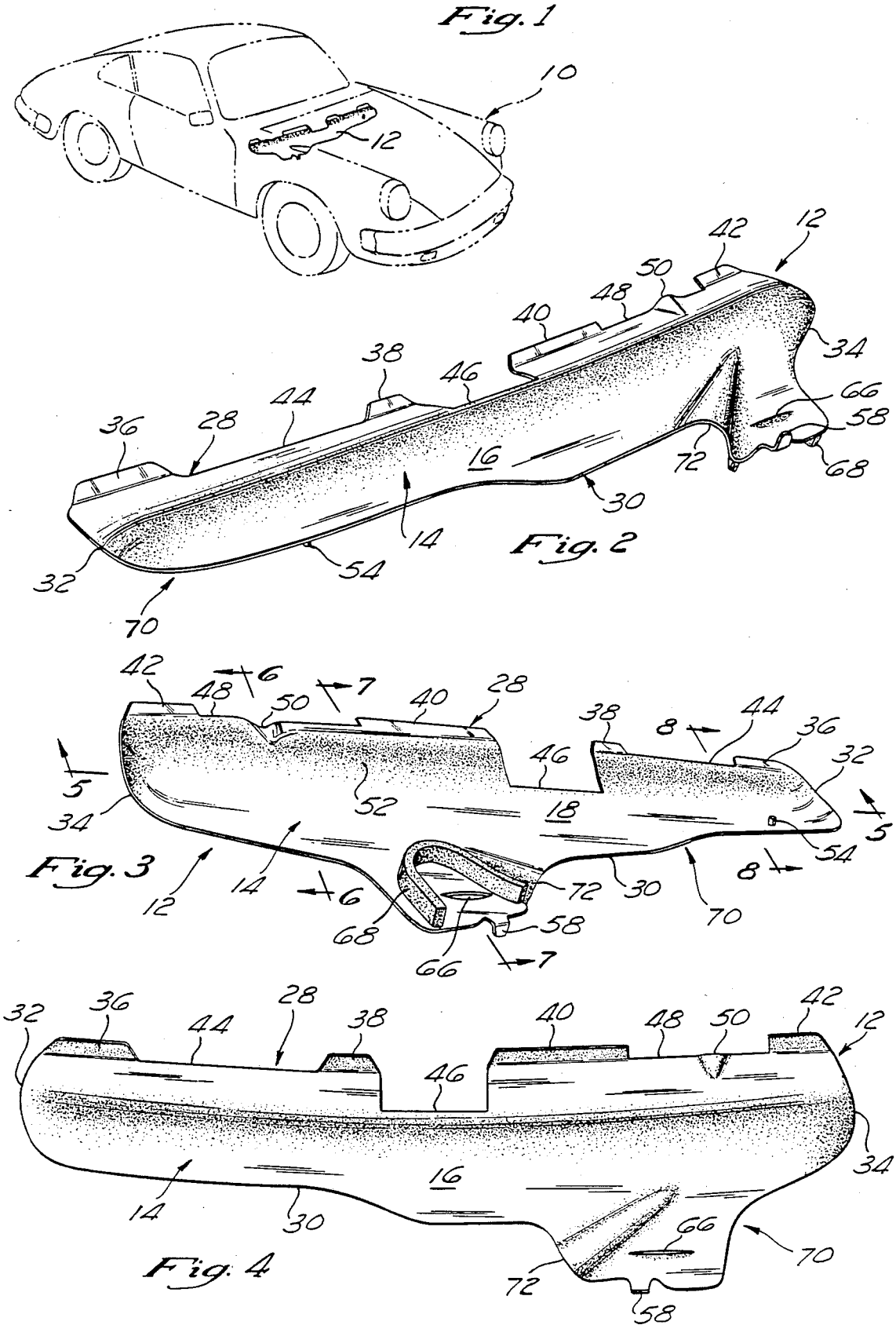

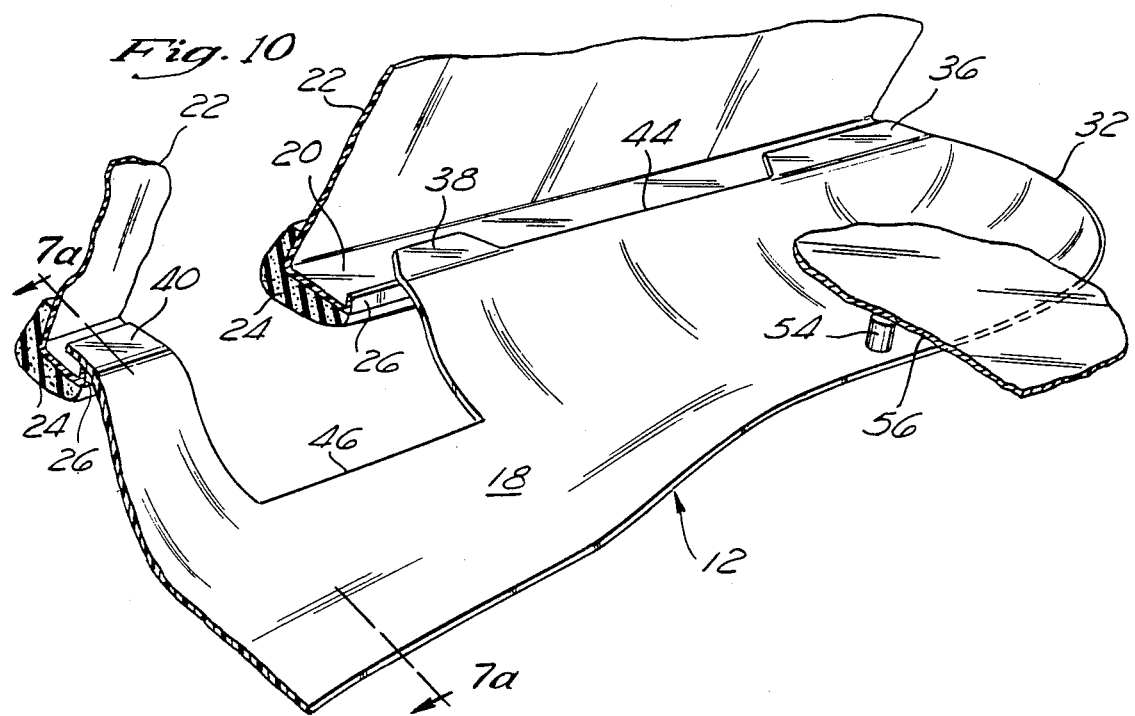
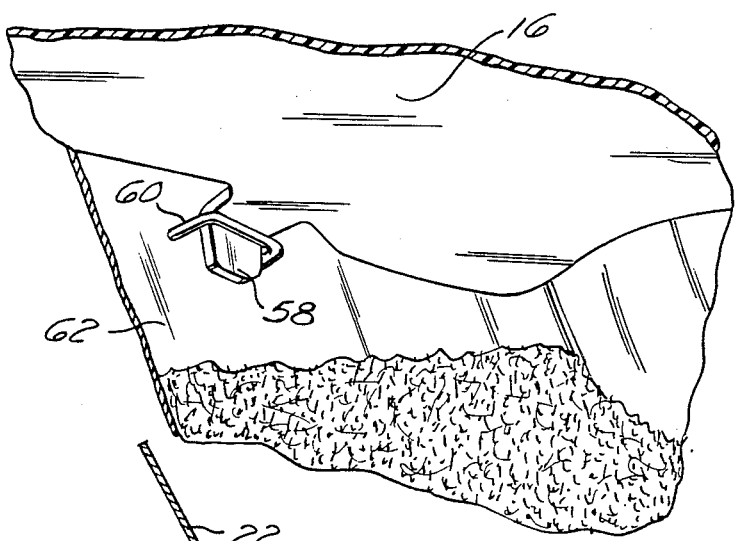
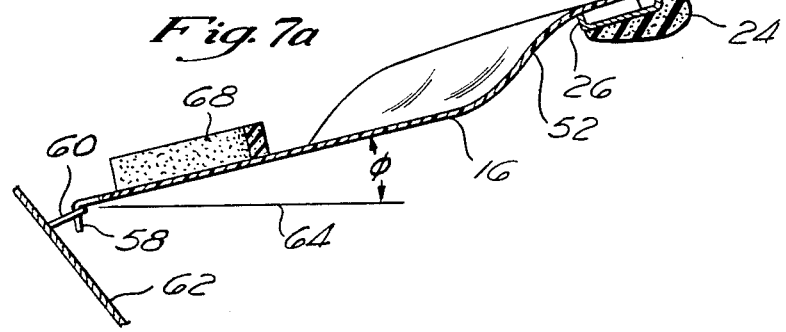

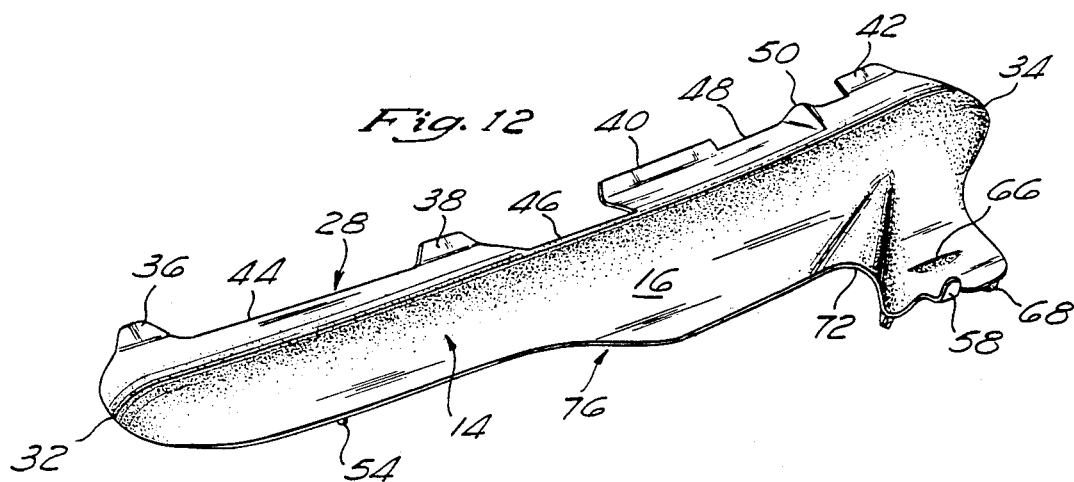
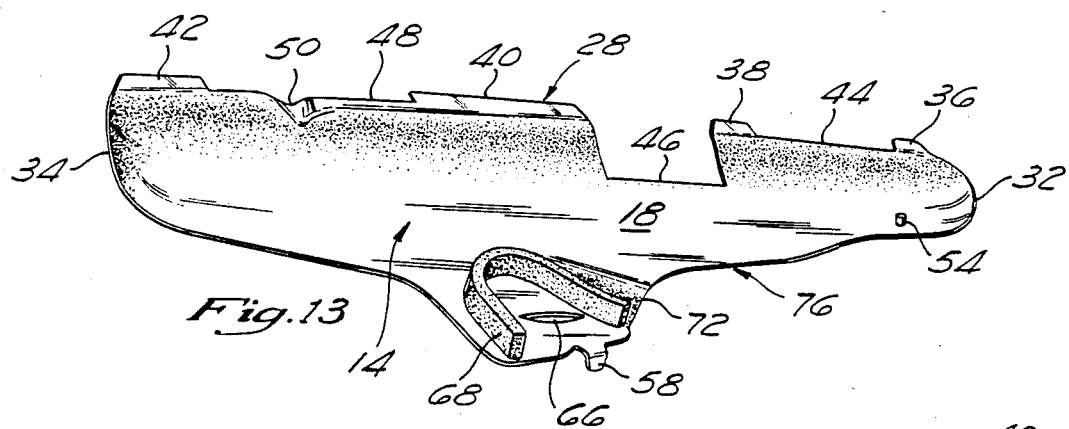
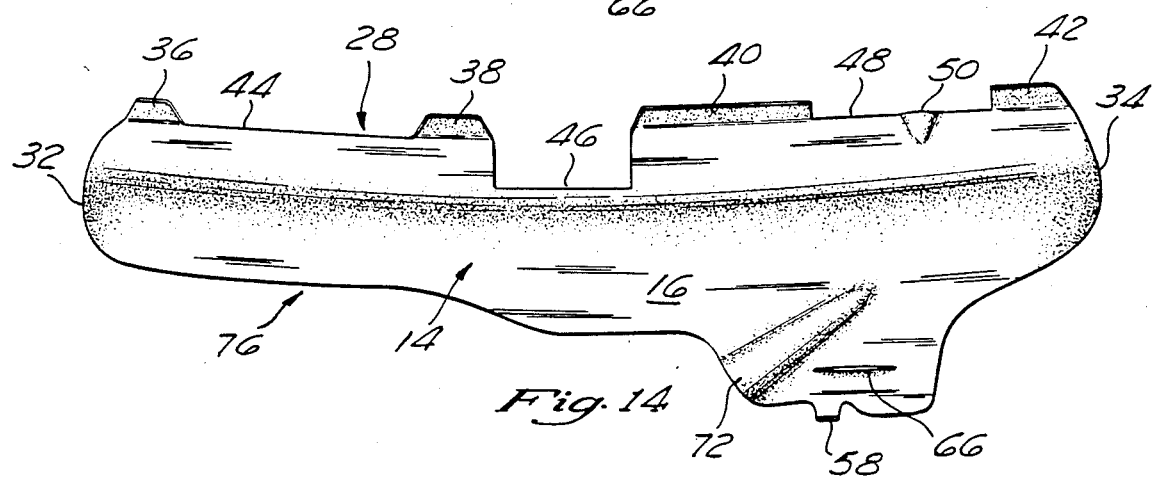

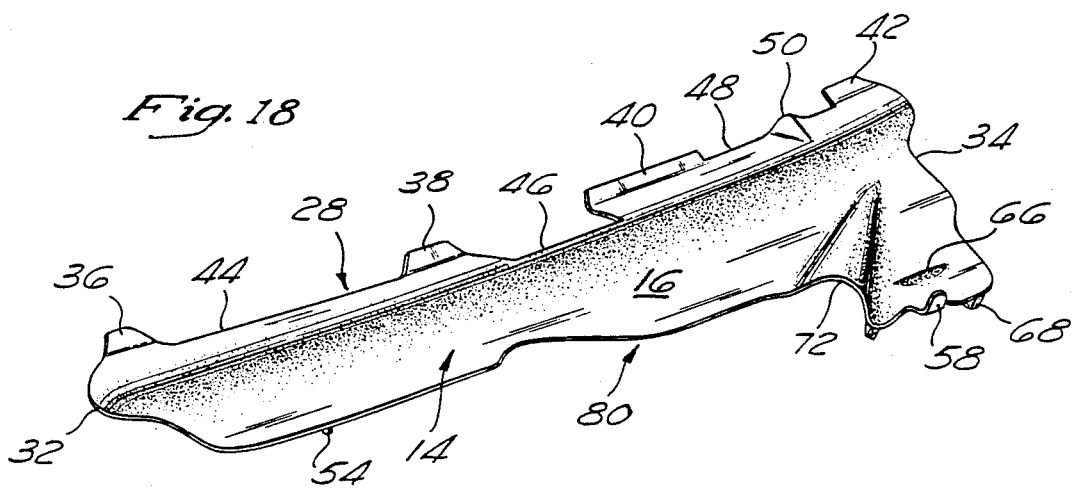
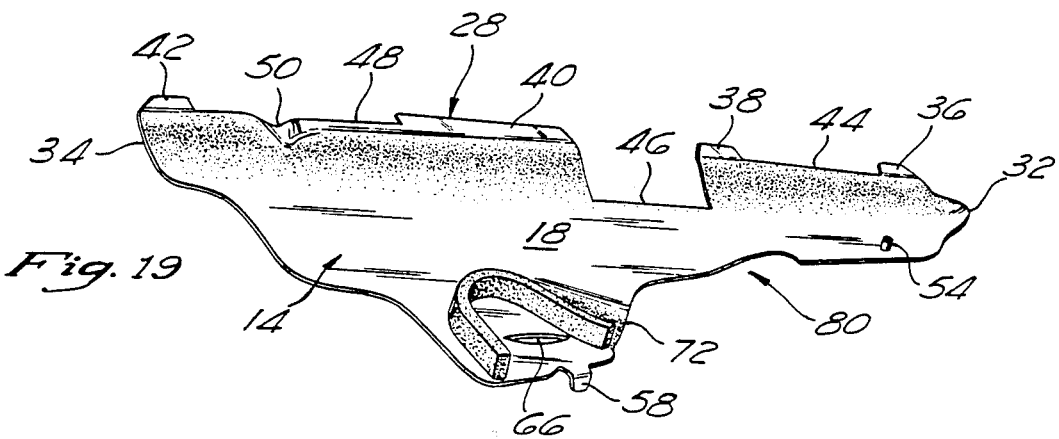
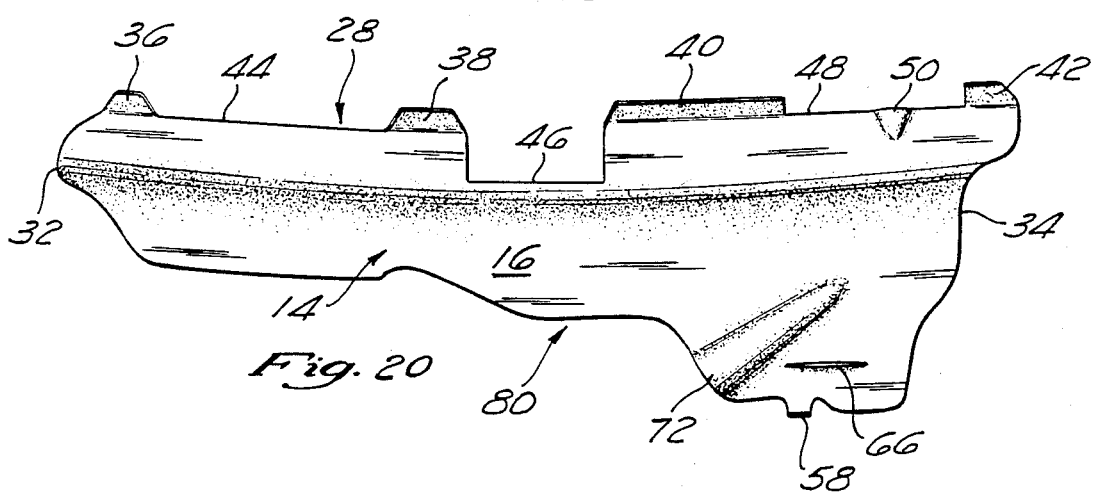

UNDER DASH COVER

CROSS-REFERENCE TO RELATED APPLICATION

The benefit under Title 35, of the U.S. Code, 120 of co-pending U.S. application Ser. No. Des. 96,225, filed May 10, 1988 is hereby claimed.

BACKGROUND OF THE INVENTION

The present invention relates generally to the field of automotive accessories. More specifically, the present invention relates to a detachably attached panel for closing off the bottom of the space under a vehicle dashboard.

In many automotive vehicles, the area directly below the dashboard, adjacent the instrument panel is left open, so as to facilitate access to wires and other parts residing thereunder, which may later require repair or replacement. While this may be beneficial from the practical standpoint of view of a repairman, dangling wires are not aesthetically appealing and may be a nuisance to front seat occupants of the vehicle.

Exemplary of an automobile having an uncovered under dash area is the 911 body style Porsche. Heretofore, this particular model has exhibited an unsightly under dash area, presented by dangling wires and other protruding equipment, such as stereo equipment under the dashboard. In addition to being unattractive, low hanging wires can also present a nuisance to front seat occupants of the vehicle. Front seat passengers may get their feet tangled in the wires, which may then become disengaged from their respective terminals. The luxurious aesthetic qualities of the automobile would be greatly enhanced if the tangled mess under the dashboard were concealed in an unobtrusive manner.

There are some prior art devices which are adapted to cover the area under a vehicle dashboard, for example Japanese Pat. No. 128968 to Hagiwara. Hagiwara describes a vehicle screening unit, fixedly attached between the lower surface portion of an instrument panel and the floor, to conceal mechanisms in the lower area of the instrument panel and improve heating, cooling and sound screening effects within the vehicle. The screening unit extends from the lower area of the instrument panel to the vehicle floor, and includes cut-out portions for the brake pedal, accelerator, and clutch. Attachment of the screening unit within the vehicle may be accomplished with screws, a suitable adhesive or some form of fastener clips. However, due to the amount of area which the screening unit is designed to cover, and the cut-out portions which encircle the various pedals near the floor of the vehicle, it is virtually impossible to make the screening unit of Hagiwara unnoticeable.

Accordingly, there is a need in the art for an under dash cover which may be quickly and easily installed under the dash of a motor vehicle so as to conceal unsightly wires, and which is quickly releasable so as to provide one with immediate access to those wires or other parts behind the instrument panel. Moreover, there is a need for an unobtrusive under dash covering, particularly designed to fit in exact harmony with the limited space under a vehicle dash to enhance the aesthetic qualities of the vehicle interior. Such a covering is specifically desirable for an elegantly sophisticated automobile such as a Porsche 911.

SUMMARY OF THE INVENTION

In accordance with the present invention, an under dash cover is provided which closes off the bottom of the space under a dashboard, behind an instrument panel, so as to conceal unsightly wires, and protruding equipment, such as stereo equipment, to enhance the aesthetic qualities of the vehicle interior. The cover is detachably mounted within a vehicle, and is uniquely sized and shaped to fit particular body styles of particular vehicle makes.

A significant feature of the invention is that the under dash cover may be readily installed within the vehicle without the use of screwdrivers, wrenches, ratchets or other installation equipment.

Another significant advantage of the under dash cover of the present invention is the ease with which the cover may be removed from the vehicle interior so as to allow access to wires and other parts located behind the instrument panel to facilitate repair or replacement of such parts.

Yet another feature of the under dash cover of the present invention is its unobtrusiveness, made possible by the unique positioning and placement within the vehicle. The unobtrusive feature of the under dash cover of the present invention is further enhanced by the removal of an air vent cover from under the instrument panel so as to enable a more exact fit and by providing a stippled outer surface on the under dash cover so as to reduce glare, or by covering the outer surface with carpeting which is custom-matched to that of the vehicle interior. It is noteworthy that the under dash cover of the present invention is provided with a vent opening in substitution for the vent being covered by the device.

The under dash cover of the present invention is adapted to reside in a motor vehicle and more specifically, in an area underlying a fixedly disposed dashboard, adjacent an instrument panel. In general, the subject invention comprises an axially elongate body, having an outwardly facing surface and an inwardly facing surface. Contiguous with the upper edge of the elongate body is a plurality of lips, adapted to rest upon a ledge portion of the vehicle interior which is integrally connected to the lower edge of the instrument panel. Advantageously, one end of the under dash cover is much broader than the other so as to accommodate the glove compartment area of the vehicle. The lower edge of the under dash cover on the narrow end is provided with a magnet for attachment to a metal wall found underneath the dash which separates the passenger section of the vehicle from a frontal cavity which, in some instances, as in the Porsche, may be a trunk and in other cases may be an engine compartment. The opposite end of the under dash cover is then secured within the vehicle by the insertion of a tab portion into a loop, disposed on the upwardly sloping portion of the vehicle floor.

If the under dash cover is being installed in a Porsche having a 911 body style, the loop for receiving the tab portion is in the form of a metal carpet strap holder, commonly found in this particular make of vehicle. It is also possible to easily install a mating connector for the tab portion on the vehicle floor for those automobiles without such a convenience. In alternative embodiments, provisions are made for interior modifications such as air conditioning ducts, blower motors, and various other changes, including changes in the width of the interior space of the vehicle.

Further objects, features and other advantages of the present invention will become apparent from the ensuing detailed description, considered together with the appended drawings.

BRIEF DESCRIPTION OF THE DRAWINGS

FIG. 1 is a perspective view of a car, having an under dash cover, consistent with one embodiment of the present invention, operatively installed therein;

FIG. 2 is a perspective view of the outwardly facing side of the under dash cover of the present invention;

FIG. 3 is a perspective view of the inwardly facing side of the under dash cover depicted in FIG. 2;

FIG. 4 is a plan view of the outwardly facing side of the under dash cover depicted in FIG. 2;

FIG. 6 is a cross-sectional view, taken along line 6—6 of FIG. 3;

FIG. 7a is a cross-sectional view, taken along line 7a—7a of FIG. 10, showing the mounting arrangement within the vehicle;

FIG. 10 is a cross-sectional view, showing how the lips of the under dash cover of the present invention rest upon the ledge in the under dash area of the car, and the metal plate to which the magnet attaches;

FIG. 11 is a cross-sectional view, showing how the tab portion of the under dash cover fits into the carpet hook;

FIG. 12 is a perspective view of the outwardly facing side of an alternative embodiment of the under dash cover of the present invention;

FIG. 13 is a perspective view of the inwardly facing side of the under dash cover shown in FIG. 12

FIG. 14 is a plan view of the outwardly facing side of the under dash cover shown in FIG. 12;

FIG. 18 is a perspective view of the outwardly facing side of a third alternative embodiment of the under dash cover of the present invention;

FIG. 19 is a perspective view of the inwardly facing side of the under dash cover shown in FIG. 18;

FIG. 20 is a plan view of the outwardly facing side of the under dash cover shown in FIG. 18;

DETAILED DESCRIPTION OF THE PREFERRED EMBODIMENT

Figure 5:
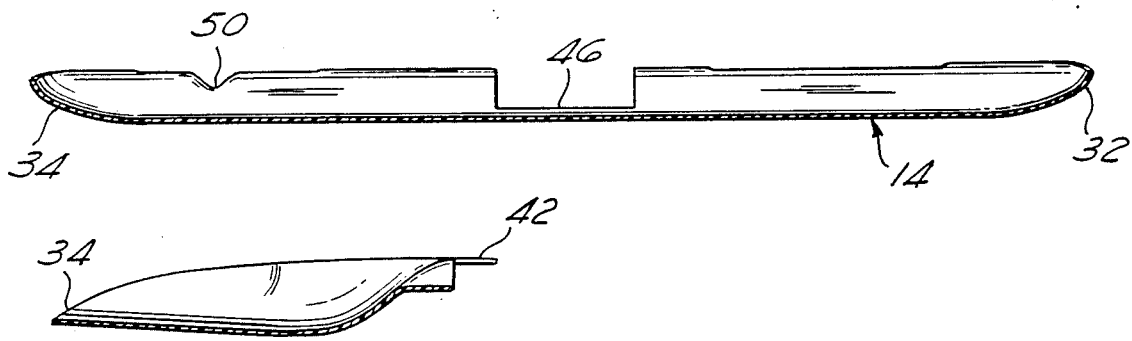
FIG. 5 is a cross-sectional view, taken along line 5—5 in FIG. 3.

Referring now to the drawings in detail, wherein like reference numerals designate like elements throughout the several views thereof, several preferred embodiments of the present invention will be described. While the preferred embodiments described herein are intended for use with vehicles bearing the standard steel body of the 911 Porsche, it will be apparent to one of ordinary skill in the art that certain principles and features of the present invention can be applied to any motor vehicle having an uncovered under dash area.

Turning now to FIG. 1, there is shown generally at 10, an outline of a motor vehicle, having an under dash cover 12 embodying the present invention in a preferred form, operatively installed therein. As more clearly illustrated in FIGS. 2-4, the under dash cover 12 is an axially elongate formed body 14, preferably made of ABS plastic, having an outwardly facing surface 16 (FIGS. 2 and 4) and an inwardly facing surface 18 (FIG. 3). The outwardly facing surface 16 has a rough, stippled texture which reduces glare, whereas the inwardly facing surface 18 is substantially smooth, and has a shiny appearance. Thus, when the under dash cover 12 is operatively installed within the vehicle 10, the inwardly facing surface 18 faces upwardly towards the dashboard and the outwardly facing surface 16 faces outwardly toward the vehicle interior. Due to the positioning and location of the under dash cover 12 within the vehicle 10, and the roughened finish on the outwardly facing surface 16, the under dash cover 12 is substantially unobtrusive.

Figure 7:
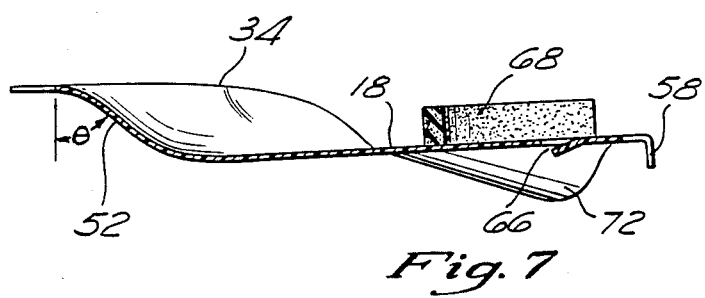
FIG. 7 is a cross-sectional view, taken along line 7—7 of FIG. 3.

Significantly, the under dash cover 12 of the present invention is adapted to rest on a ledge portion 20 disposed along the bottom edge of the vehicle instrument panel 22 (see FIG. 10). The ledge portion 20 extends forwardly, toward the frontal cavity of the vehicle, and is covered by a kneepad 24. As illustrated in FIG. 7a, the ledge portion 20 is at a slight downwardly sloping angle with respect to an imaginary horizontal line drawn across the dashboard and includes an upwardly extending lip 26. The upwardly extending lip 26 of the ledge portion 20 provides a retaining wall for a bundle of wires below the vehicle steering column (not shown).

Figure 8:
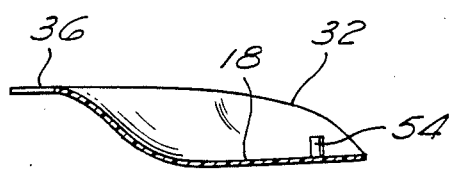
FIG. 8 is a cross-sectional view, taken along line 8—8 of FIG. 3.

As illustrated in FIGS. 2-4, the under dash cover 12 of the present invention has an upper edge 28, a lower edge 30 and a number of significantly unique curves and bends throughout the length thereof. Preferably, the body 14 of the under dash cover 12 is approximately 47" in length, with a relatively convex curvature running along the length of the body 14 with respect to the outwardly facing surface 16. The opposite ends 32, 34 of the body 14 exhibit an upward curvature when viewed from the inwardly facing surface 18 thereof. As illustrated in the drawings, the under dash cover 12 has a broad end 34 (FIG. 7) and a narrow end 32 (FIG. 8). The broad end 34 is approximately 13.5 inches at its widest point, while the narrow end 32 is approximately 6.5 inches in width, measured along line 8—8 of FIG. 3.

Disposed along the upper edge 28 of the body 14 of the under dash cover 12 are a plurality of lips 36, 38, 40, 42. These lips are formed as part of the body 14 and are instrumental in operatively securing the under dash cover 12 within the vehicle 10. Intermediate each pair of lips, is a strategically placed notch, adapted to promote a superior fit of the under dash cover 12 within the vehicle 10. The notch 44 between lips 36 and 38 allows open space under the vehicle steering column (not shown) so as not to interfere with the bundle of wires residing thereunder. The deep notch 46 intermediate lips 38 and 40 provides an opening to accommodate an ashtray (not shown). The third notch 48 is designed to go around the vehicle glove compartment (not shown).

Also disposed along the upper edge 28 of the under dash cover 12 is a dipped portion 50 to accommodate a glove box fastener, such as a screw or bolt (not shown). As more clearly illustrated in FIG. 7, the lips 36, 38, 40, 42 of the under dash cover 12 lie in a substantially horizontal plane abutted against an angled portion 52 of the elongate body 14. This angled portion 52 is the result of the convexly curved longitudinal axis of the under dash cover. In order to be as unobtrusive as possible, it has been determined that the angled portion 52 should be subtended at an angle $\theta$ of between 45° and 60° with respect to the lips before leveling off into a second, substantially horizontal plane. In the preferred embodiment, such an angle is between 52° and 53°, and advantageously 52.75°.

As most clearly illustrated by FIGS. 3 and 8, the narrow end 32 of the under dash cover 12 is equipped with a magnet 54, located near the lower inside edge of the under dash cover 12. The magnet 54 is adapted to attach to a metal portion 56 under the dashboard which separates the passenger section of the vehicle from the frontal cavity so as to facilitate installation of the cover 12. Preferably, the magnet 54 is an insulated cylindrical ceramic magnet, approximately 1" in height as commonly available from Bunting, part number BM1908X1. The magnet 54 is attached to the inwardly facing surface 18 of the under dash cover 12 by suitable adhesive. It has been found that a two-part high strength adhesive, sold under the name Weld-On 10 A&B, as manufactured by Industrial Polychemical Service, Gardena, Calif. is particularly well suited to bonding aluminum to ABS plastics.

The broader end 34 of the under dash cover 12 exhibits a tab portion 58, devised for easy insertion into an associated mating connector, or loop 60, located on the upwardly sloping surface of the vehicle floor 62. In Porsche 911's, such a loop 60 is commonly provided as a metal carpet strap holder for holding the vehicle carpeting in place. The mating of the tab portion 58 of the under dash cover with its associated connector 60 on the vehicle floor 62 is instrumental in the quick release features of the present invention. However, if there is no associated connector 60 or carpet strap holder to mate with the tab portion 58 so as secure the under dash cover 12 in place, a loop 60 may be easily installed on the vehicle floor 62 to receive the tab portion 58. Alternatively, the broader end 34 of the under dash cover 12 may also be provided with a magnet (not shown) or other quick release connecting mechanism, or may be secured within the vehicle 10 by means of a screw or other suitable fastener.

It has been determined that the under dash cover 12 of the present invention can be made substantially unobtrusive by virtue of the unique positioning and placement within the vehicle interior. Preferably, the under dash cover will reside within the vehicle at an angle $\phi$ (FIG. 7a) between the range of 19° and 23° with respect to a horizontal plane 64 when properly installed, and most preferably at an angle of 21°. Similar effects may also be had even if the under dash cover 12 is subtended at an angle of not more than 26°. Variations of the angle of the device with respect to the horizontal can occur if the tab 58 is lengthened or shortened. Further variations may be due to the positioning of the loop 60 within the vehicle interior. If the loop 60 is not factory installed in the vehicle, it should be placed in line with the horizontal plane 64, located between approximately 3.375 and 6.375 inches below the kneepad 24 covering the lower edge of the instrument panel 22. Preferably, the loop 60 will be disposed between 4.375 and 5.375 inches below the kneepad 24, and in the preferred embodiment, such a distance is 4.875 inches.

A small vent opening 66 is provided proximate to the tab portion 58, to replace the passenger side under dash fresh air vent cover (not shown). As best seen in FIG. 3, a U-shaped seal 68 is provided on the inner surface 18 of the under dash cover 12 and surrounds the vent opening 66. Preferably, the seal 68 is formed of charcoal polyester-urethane foam, and is secured to the inwardly facing surface 18 of the under dash cover 12 by a weather strip adhesive as commonly sold by 3M Corporation under part number 051135-08011. It has been determined that this seal 68 aids in channeling air through the vent opening 66 in a forward direction, so as to maintain a constant supply of fresh air to the occupants of the vehicle.

Since 1967, the standard steel frame of 911 body style Porsches has remained substantially constant. Prior to 1984, two basic models, the "Coupe" and the "Targa" were commonly produced. Typically, the Targa model is differentiated from the Coupe model in that the Targa is provided with a removable soft top with a solid glass rear window. In addition, in 1983, the first "Cabriolet," a soft top convertible, having the same basic steel structure as that of the Targa model was introduced. Due to absence of a hard top, additional strength and support is required at the side walls, thus dictating the need for thicker walls. Accordingly, the body front interior dimension is smaller in a Targa than in a Coupe model. In 1984, with the addition of blower motors to either side of the vehicle, the body interior became even narrower, as the covers for these blower motors rested within the vehicle interior. Accordingly, five (5) different embodiments of the present invention are illustrated, each of which have been tailor made to fit certain models of Porsches.

The under dash cover 70 illustrated in FIGS. 2–4 is particularly suited for use in a pre-1984 911 Coupe model with factory installed air conditioning. A conical shaped hump 72, having a well defined convexity with respect to the outer surface 16 of the under dash cover is provided for accommodating an air conditioning duct. This is necessitated due to the fact that the under dash cover of the present invention is formed to be in exact harmony with the area it is designed to conceal. Further, when properly installed, the under dash cover is substantially unobtrusive, so as to enhance the luxurious aesthetic qualities befitting such a lavish automobile. This unobtrusiveness is further enhanced by stippling the outer surface 16 of the under dash cover so as to reduce glare, or by covering the under dash cover with carpeting to match the vehicle interior.

Figure 21:
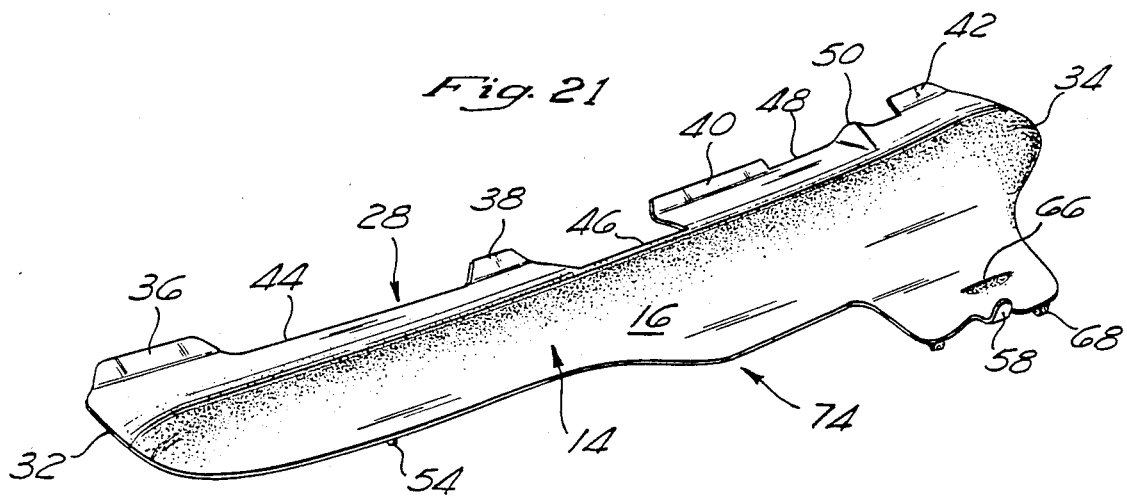
FIG. 21 is a perspective view of the outwardly facing side of a fourth alternative embodiment of the under dash cover of the present invention.
Figure 22:
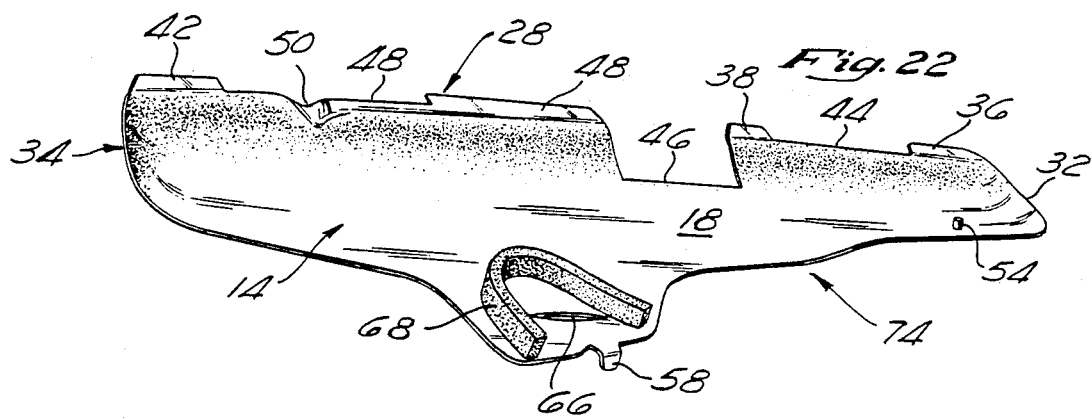
FIG. 22 is a perspective view of the inwardly facing side of the under dash cover shown in FIG. 21.
Figure 23:
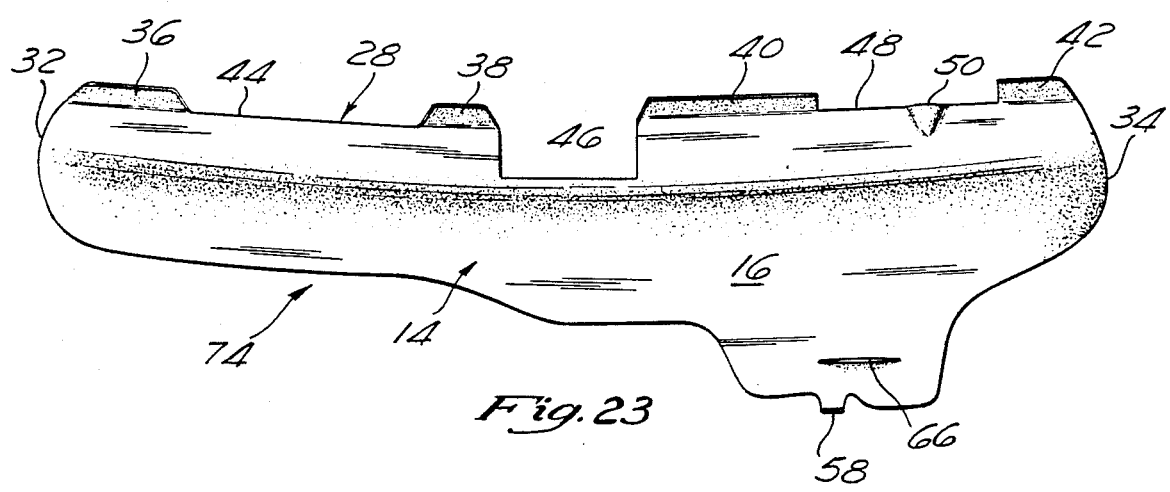
FIG. 23 is a pan view of the outwardly facing side of the under dash cover shown in FIG. 21.

In the event that the pre-1984 Coupe model is no equipped with air conditioning, and therefore has no air conditioning duct, the conical hump 72 is not necessary. Accordingly, there is shown in FIGS. 21–23, an under dash cover 74 for use in a 911 Coupe, having no conical hump 72 at the broader end 34.

FIGS. 12–14 illustrate an under dash cover 76 adapted for use in a pre-1984 911 Targa with air conditioning. This embodiment differs from that illustrated in FIGS. 2-4 in that it is shorter in length due to the thicker sides of the vehicle, and in the more pronounced curvature at either end. Preferably, the under dash covers made for use within pre-1984 Targa models are 3 to 4 inches shorter in length than those model used in Pre-1984 Coupe models to take into account the wall thickness.

Figure 15:
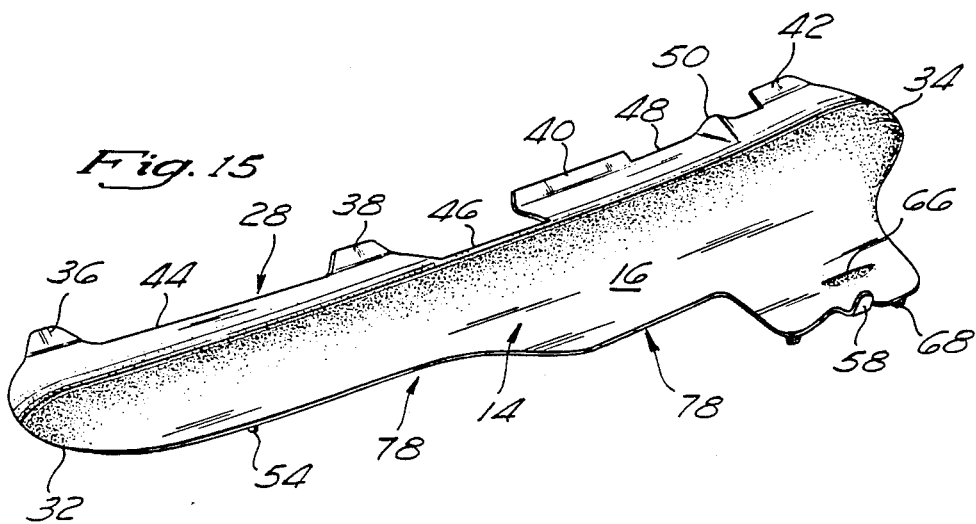
FIG. 15 is a perspective view of the outwardly facing side of a second alternative embodiment of the under dash cover of the present invention.
Figure 16:
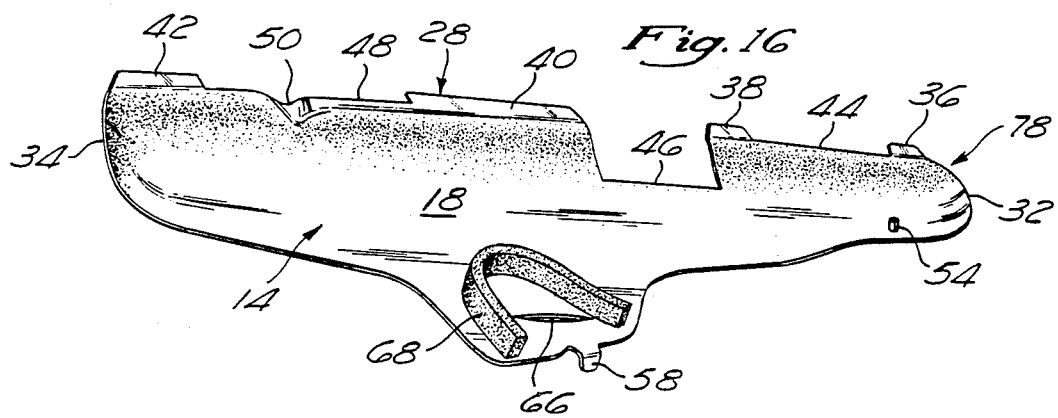
FIG. 16 is a perspective view of the inwardly facing side of the under dash cover shown in FIG. 15.
Figure 17:
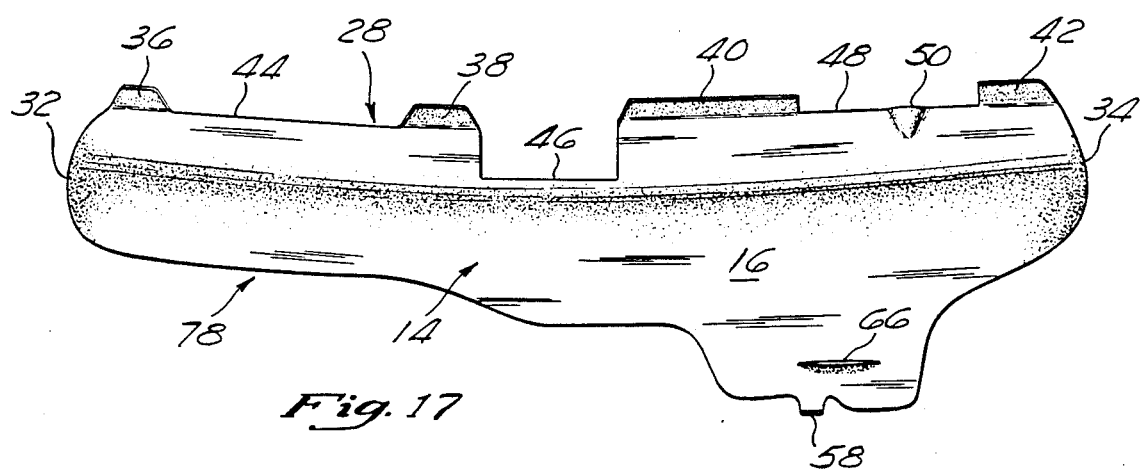
FIG. 17 is a plan view of the outwardly facing side of the under dash cover shown in FIG. 15.

Yet another modified embodiment is illustrated in FIGS. 15-17. This under dash cover 78 is devised to be used in a pre1984 Targa without air. Since the car is not equipped with air conditioning, there is no air conditioning duct, and thus, no conical hump is required. With the exception of the air conditioning duct hump, this cover 78 is much like the cover 76 illustrated in FIGS. 12-14.

The more recent 911 Porsche models, beginning with the year 1984, although still consistent with the basic 911 body style, are equipped with blower motors, the covers of which reside in the vehicle interior. Thus, as illustrated in FIGS. 18-20, the elongate body 14 of the under dash cover 80 for use with such newer models of Porsches is considerably shorter than either of the under dash covers for use with the pre-1984 cars. Preferably, the under dash cover 80 for 1984 and later 911's is approximately 40 inches in length, a decrease in 3 to 4 inches over the Targa models and approximately 7 inches shorter than the Coupe. Note that there is only one model of under dash cover for these later cars, as all come equipped with air conditioning ducts, and thus the under dash cover 80 requires a conical hump 72 for the air conditioning duct.

METHOD OF USING THE UNDER DASH COVER

Each embodiment of the under dash cover of the present invention is adapted for easy installation in the vehicle for which it was designed. In general, prior to the installation of the device, the passenger side under dash fresh air vent cover and the center fresh air vent cover, if any (not shown), should be removed. This is to ensure that the under dash cover 12 fits snugly in its intended place. Additionally, if a loop 60 for receiving the tab portion 58 of the under dash cover 12 is not already resident on the vehicle floor 62, one may be installed in the position described above. Finally, if the under dash cover 80 is to be installed in a 1984 or later model Porsche 911, the passenger side blower motor cover (not shown) should also be removed prior to the installation of the device.

The under dash cover 12, once aligned within the vehicle 10 is raised so that the lips 36, 38, 40, 42 rest on the ledge portion 20, thereby supporting the upper edge 28 of the under dash cover 12 within the vehicle 10. Once the under dash cover 12 is properly positioned with respect to the ledge portion 20 of the vehicle, the lower edge 30 of the under dash cover 12 is rotated upwardly, until the magnet 54 is in engagement with a metal wall 56 under the dash which separates the passenger section of the vehicle from the frontal cavity. The attachment of the magnet 54 to the metal wall 56 aids in steadying the under dash cover 12 and facilitates the ease of installation thereof. The tab portion 58 is then lifted slightly, and inserted into the loop 60 to secure the under dash cover 12 in place. It is noteworthy that once the initial installation has taken place, there is no need for tools of any sort to remove or replace the under dash cover 12 of the present invention. The only tools required are those necessary to remove the under dash fresh air vent covers (not shown), which is replaced by the vent opening 66 in the under dash cover itself, and the removal and replacement of the passenger side blower motor cover if the device is to be used on a post 1984 vehicle.

METHOD OF MAKING THE UNDER DASH COVER

Preferably, the elongate body 14 of the under dash cover 12 of the present invention is formed from extruded ABS plastic. ABS sheet plastic is generally available, and in particular may be obtained from CADCO. This particular material was selected due to its outstanding formability, high impact strength, high tensile strength and stiffness, excellent ductility and resistance to many chemicals and plasticizers. Preferably, the particular type of ABS plastic used to form the under dash covers of the present invention is ⅛ inches thick and has a haircell finish on one side. This haircell finish is responsible for the stippling which reduces glare substantially, and improves the unobtrusive features of the under dash cover.

Figure 9:
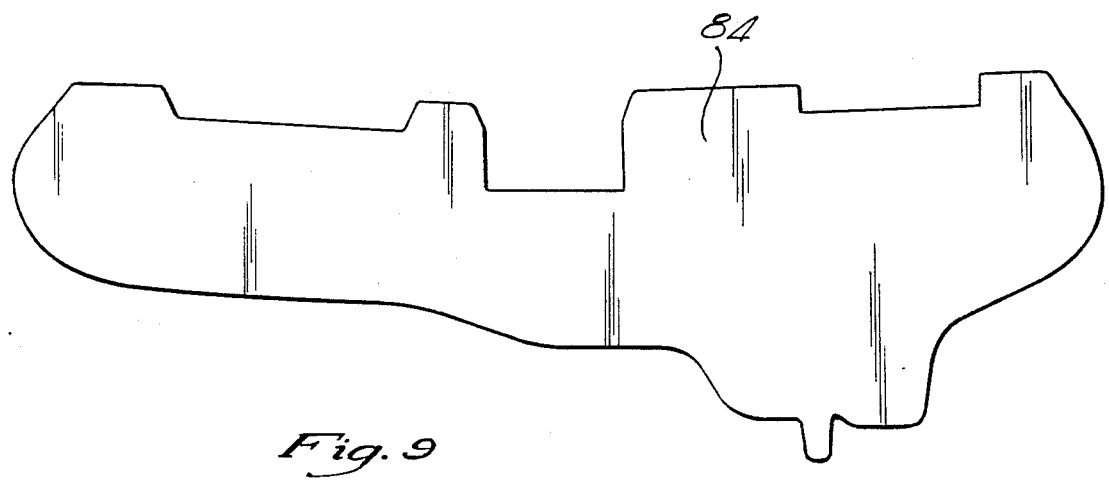
FIG. 9 is a plan view of the cut-out form for the under dash cover of the present invention prior to molding.

A general outline 84 of the form in which the plastic is cut prior to molding is illustrated in FIG. 9. Advantageously, since the basic differences in the various embodiments of the under dash cover lies in the length of the cover and whether or not the vehicle is equipped with an air conditioning duct, initially, only two cut-out forms and four molds were used to make all five (5) embodiments. One cut-out form and two molds were used for all embodiments designed to cover the under dash area in those vehicles without an air conditioning duct. The second cut-out form and pair of molds were used for those embodiments adapted for use in a vehicle with air conditioning ducts. The difference between the cut-out forms is in the size of the broader end prior to molding. To provide sufficient material to make the conical hump which accommodates the air conditioning duct, the cut-out form for the air conditioned models is sized approximately ½ inch larger than the other cut-out form. After the cut-out forms have been molded, the under dash cover is trimmed to fit the particular style of Porsche in which it is to be used. It is also contemplated to have one cut-out form and one mold for each embodiment so as to reduce the time and costs of production.

Care should be taken that the elongate surface 14 of the under dash cover follows the grain pattern of the material, so as to ensure proper deformation of the material, as is well known in the art. The plastic is then heated to an elevated level, which is preferably 350° F., for a period of seven (7) minutes so as to make the plastic pliable. During this heating process, the cutout form stretches lengthwise and shrinks widthwise. The heated plastic is then laid over a cast mold (not shown), and covered with a bladder. Vacuum suction is then applied in a well known manner to the table, forcing the pliable plastic sheet into the shape of the mold.

When the mold has cooled, the under dash cover is removed, and the finishing touches applied. For example, the magnet 54 and seal 68 attached to the inner side 18 by suitable adhesive, as described above. The ends 32, 34 can be trimmed to the length necessary to enable the under dash cover 12 to be used in the Targa and Cabriolet models, or the newer (1984 on) models, or separate molds may be used for each model.

It will be appreciated that certain structural variations may suggest themselves to those skilled in the art.

The foregoing detailed description is to be clearly understood as given by way of illustration, the spirit and scope of this invention being limited solely by the appended claims.

What is claimed is:

1. In combination, a motor vehicle having a dashboard, an instrument panel with a ledge portion projecting away from the vehicle interior, and a metal wall separating the passenger section of the vehicle from the frontal cavity, an improvement comprising:
    an under dash cover having an axially elongate body, formed to fit the contours of the area under the dashboard, proximate the instrument panel, said body having a outwardly facing surface, an inwardly facing surface, an upper edge and a lower edge;
    at least one lip, connected to said body along the upper edge thereof, said lip adapted to rest on the ledge portion of the instrument panel, which is situated behind the instrument panel, under the dashboard;
    a magnet, attached to said inwardly facing surface proximate said lower edge and adjacent one end of said body, said magnet adapted to engage the metal wall so as to help hold said under dash cover in place; and
    means for quickly releasably connecting said body at the floor board edge, said means for connecting including a tab portion and an associated mating connector.

2. An under dash cover as defined by claim 1, wherein said associated mating connector is a loop, secured to the vehicle floor and adapted to receive said tab portion so as to secure said under dash cover in place.

3. An under dash cover as defined by claim 1, further comprising:
    a vent opening, proximate said tab portion, said vent opening being surrounded by a U-shaped seal, secured to said inwardly facing surface, said seal adapted to channel air flow in a forward direction, toward the vehicle interior.

4. An under dash cover as defined by claim 3, wherein said seal is formed of charcoal polyester-urethane.

5. An under dash cover as defined by claim 3, wherein said body exhibits a conical hump proximate said vent opening, said hump adapted to accommodate an air conditioning duct once said under dash cover is operatively installed.

6. An under dash cover as defined by claim 1, wherein said outwardly facing surface of said under dash cover is stippled to reduce glare.

7. A motor vehicle as defined by claim 1, wherein said under dash cover is made unobtrusive by covering said outwardly facing surface with carpeting to match the vehicle interior.

8. An under dash cover as defined by claim 1, wherein said vehicle is a Porsche having a 911 body style.

9. A detachably attached panel, suitable for mounting within a vehicle, said panel adapted to close off an area behind a vehicle instrument panel under a dashboard, comprising:
    an axially elongate body, formed to fit the contours of the area under the dashboard, proximate the instrument panel, said body having an inwardly facing surface, an outwardly facing surface, an upper edge and a lower edge;
    at least one lip, connected to said body along the upper edge thereof, said lip adapted to rest on a ledge portion of the instrument panel, which is situated behind the instrument panel, under the dashboard; and
    a tab portion, extending substantially perpendicularly from said lower edge of said elongate body, said tab portion adapted for insertion into an associated mating connector.

10. A detachably attached panel as defined by claim 9, further comprising a vent opening proximate said tab portion, said vent opening being surrounded by a U-shaped seal, secured to said inwardly facing surface, said seal adapted to channel air flow in a forward direction, into said vehicle interior.

11. A detachably attached panel, as defined by claim 10, wherein said tab is adapted for insertion into a loop which is secured to the upwardly sloping floor surface in said vehicle.

12. A detachably attached panel as defined by 11, wherein said axially elongate body exhibits a conical hump near said vent opening on the outer surface thereof, said hump providing a channel on the inwardly facing surface into which an air conditioning duct may reside when said device is operatively installed within said vehicle.

13. A detachably attached panel as defined by claim 10, wherein said outwardly facing surface is stippled so as to reduce glare.

14. A detachably attached panel as defined by claim 10, wherein said outwardly facing surface of said elongate body is covered with carpeting so as to provide an unobtrusive covering for said space behind the instrument panel.

15. A detachably attached panel as defined by claim 10, wherein vehicle is a Porsche having a 911 body style.

16. A quick release covering for closing off the bottom of the space under a vehicle dashboard, comprising:
    an elongate panel shaped to fit the contours of the area underneath the dashboard, said panel having a an upper edge, a lower edge and first and second ends;
    a magnet, secured to said panel proximate said lower edge and said first end, said magnet adapted to attach to a metal wall under the dashboard of the vehicle, said wall separating the passenger section of the vehicle from the frontal cavity; and
    a connector element, connected to said panel proximate said lower edge and said second end, said connector element adapted for quick releasability and insertion into a mating connector element, secured to an upwardly sloping surface of the vehicle floor.

17. A method of concealing unsightly wires hanging below the vehicle dashboard of a motor vehicle, comprising the steps of:
    providing an under dash cover, having a outwardly facing surface, an inwardly facing surface, at least one lip, a magnet and a tab portion;
    aligning said lips of said under dash cover with a ledge portion of the dashboard;
    rotating said under dash cover upwardly toward said dashboard until said magnet engages a metal surface under the dashboard of the motor vehicle; and lifting said tab portion above a loop element, secured to an upwardly sloping surface of the vehicle floor and inserting said tab therethrough so as to secure said under dash cover in place.

18. An under dash cover as defined by claim 17, wherein said vehicle is a Porsche having a 911 body style.

19. An unobtrusive covering for closing off the bottom of the space behind a vehicle instrument panel under a dash board, comprising:
- an elongate panel, formed to fit the contours of the area under the dashboard, proximate the instrument panel, said elongate panel having an outwardly facing surface, an inwardly facing surface, an upper edge, a lower edge, and first and second ends, said elongate panel having a convex curvature with respect to the outwardly facing surface thereof;
- at least one lip, connected to said elongate panel along the upper edge thereof, said lip subtended at an angle with respect to the elongate body, resulting from the convexity thereof and adapted to rest on a ledge at the base of the instrument panel projecting toward the vehicle frontal cavity;
- a magnet secured to said inwardly facing surface, proximate said lower edge and adjacent said first end of said elongate panel, said magnet adapted to engage a metal wall under the dashboard which separates the passenger section of the vehicle from the frontal cavity; and
- a tab extending substantially perpendicularly from said lower edge of said elongate panel, proximate said second end, said tab adapted to mate with a loop, said loop disposed on an upwardly sloping surface of the vehicle floor.

20. An unobtrusive covering as defined by claim 19, wherein said lip is subtended at an angle of between 45° and 60° with respect to said elongate panel.

21. An unobtrusive covering as defined by claim 19, wherein said lip is subtended at an angle of between 53° and 53° with respect to said elongate panel.

22. An unobtrusive covering as defined by claim 19, wherein said loop lies along a horizontal plane which is at least 3.375 inches and not more than 6.375 inches below said ledge at the base of the instrument panel.

23. An unobtrusive covering as defined by claim 22 wherein said elongate panel is positioned within the vehicle under the dashboard and is subtended at an angle of not more than 26° with respect to said horizontal plane when properly installed.

24. An unobtrusive covering as defined by claim 23, wherein said elongate panel is subtended at an angle of between 19° and 23°.

25. An unobtrusive covering as defined by claim 24, wherein said angle is 21°.

26. An unobtrusive covering as defined by claim 19, wherein said vehicle is a Porsche having a 911 body style.

* * * * *

UNITED STATES PATENT AND TRADEMARK OFFICE
CERTIFICATE OF CORRECTION

PATENT NO. : 4,887,861

DATED : December 19, 1989

INVENTOR(S) : John Moch and Ronald Jones

It is certified that error appears in the above-identified patent and that said Letters Patent is hereby corrected as shown below:

COLUMN 3, LINE 67, CHANGE " a pan view " To --a plan view--

COLUMN 6, LINE 60, CHANGE " is no " To --is not--

COLUMN 10, LINE 22, CHANGE " by 11" To --by claim 10--

Signed and Sealed this

Seventh Day of July, 1992

Attest:

DOUGLAS B. COMER

Attesting Officer

Acting Commissioner of Patents and Trademarks